United States Patent
Valero Navazo et al.

(10) Patent No.: US 10,668,662 B2
(45) Date of Patent: Jun. 2, 2020

(54) FORMING A THREE-DIMENSIONAL OBJECT

(71) Applicant: HEWLETT-PACKARD DEVELOPMENT COMPANY, L.P., Houston, TX (US)

(72) Inventors: Juan Manuel Valero Navazo, Sant Cugat del Valles (ES); Esteve Comas, Sant Cugat del Valles (ES); Alejandro Manuel De Pena, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/075,545

(22) PCT Filed: May 12, 2016

(86) PCT No.: PCT/US2016/032157
§ 371 (c)(1),
(2) Date: Aug. 3, 2018

(87) PCT Pub. No.: WO2017/196351
PCT Pub. Date: Nov. 16, 2017

(65) Prior Publication Data
US 2019/0176389 A1 Jun. 13, 2019

(51) Int. Cl.
*B29C 64/153* (2017.01)
*B33Y 10/00* (2015.01)
(Continued)

(52) U.S. Cl.
CPC .......... *B29C 64/153* (2017.08); *B29C 64/393* (2017.08); *B33Y 10/00* (2014.12); *B33Y 30/00* (2014.12); *B33Y 50/02* (2014.12)

(58) Field of Classification Search
CPC ..... B29C 64/153; B29C 64/393; B33Y 50/02; B33Y 30/00; B33Y 10/00
See application file for complete search history.

(56) References Cited

U.S. PATENT DOCUMENTS

| 5,411,074 A | * | 5/1995 | Naruse | ............... | B22D 17/2218 |
| | | | | | 164/151.4 |
| 5,530,221 A | | 6/1996 | Benda et al. | | |

(Continued)

FOREIGN PATENT DOCUMENTS

| CN | 104972121 | 10/2015 |
| CN | 105034394 | 11/2015 |

(Continued)

OTHER PUBLICATIONS

M. Faes et al; "Process Monitoring of Extrusion Based 3D Printing via Laser Scanning"; Sep. 2014; https://www.researchgate.net/publication/265601185_Process_Monitoring_of_Extrusion_Based_3D_Printing_via_Laser_Scanning.

*Primary Examiner* — Christopher E. Everett
(74) *Attorney, Agent, or Firm* — Fabian Vancott (57) ABSTRACT

A method of forming a three-dimensional object includes detecting, with a thermographic camera, a temperature of a control point within at least one zone of the build material bed, and adjusting a power level supplied to at least one of the lamps of the array of lamps if the detected temperature of the control point of the at least one zone of the build material bed is not equal to a set temperature.

17 Claims, 6 Drawing Sheets

(51) Int. Cl.
*B33Y 30/00* (2015.01)
*B33Y 50/02* (2015.01)
*B29C 64/393* (2017.01)

(56) References Cited

U.S. PATENT DOCUMENTS

| | | |
|---|---|---|
| 6,815,636 B2 | 11/2004 | Chung et al. |
| 7,213,915 B2 | 5/2007 | Tsutsumi et al. |
| 2004/0200816 A1* | 10/2004 | Chung ............... G05D 23/1919 219/121.83 |
| 2005/0061241 A1 | 3/2005 | West |
| 2005/0110200 A1* | 5/2005 | Fong .................. B29C 35/0805 264/494 |
| 2006/0180957 A1* | 8/2006 | Hopkinson ............. B29C 67/02 264/405 |
| 2008/0262659 A1* | 10/2008 | Huskamp ........... G05D 23/1919 700/300 |
| 2012/0100031 A1 | 4/2012 | Ljungblad |
| 2013/0193619 A1 | 8/2013 | Church et al. |
| 2014/0255666 A1 | 9/2014 | Stucker |
| 2014/0314613 A1 | 10/2014 | Hopkinson et al. |
| 2015/0183165 A1 | 7/2015 | Abe et al. |
| 2015/0328838 A1 | 11/2015 | Erb et al. |
| 2017/0014906 A1* | 1/2017 | Ng ........................ B29C 64/153 |

FOREIGN PATENT DOCUMENTS

| | | |
|---|---|---|
| CN | 105383062 | 3/2016 |
| JP | 2005-319634 | 11/2005 |
| JP | 2010520091 | 6/2010 |
| JP | 2015501369 | 1/2015 |
| WO | WO-2005007390 | 1/2005 |
| WO | WO-2015108546 | 7/2015 |
| WO | WO-2015108547 A2 * | 7/2015 |

\* cited by examiner

FORMING A THREE-DIMENSIONAL OBJECT

BACKGROUND

Additive manufacturing machines produce three-dimensional (3D) objects by building up layers of material. Some additive manufacturing machines may be referred to as "3D printing devices" because they often use inkjet or other printing technology to apply some of the manufacturing materials. 3D printing devices and other additive manufacturing machines make it possible to convert a computer aided design (CAD) model or other digital representation of an object directly into the physical object.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Additive manufacturing machines make a 3D object through the solidification of a number of layers of a build material on a powder bed within the printing device. Additive manufacturing machines make objects based on data in a 3D model of an object generated, for example, with a CAD computer program product. The model data is processed into slices each defining that part of a layer or layers of build material to be solidified. Examples of additive manufacturing described below use a technique sometimes referred to as "light area processing" (LAP). With LAP, a coalescing agent is dispensed onto a layer of build material such as a sinterable material in the desired pattern, and then exposed to electromagnetic radiation. The electromagnetic radiation may include infrared light, laser light, or other suitable electromagnetic radiation. Light absorbing components in the coalescing agent absorb the electromagnetic radiation to generate additional heat that sinters, melts, or otherwise coalesces the patterned build material, allowing the patterned build material to solidify.

Heating of the build material in LAP may occur in two processes. In a first process, the build material is heated to and maintained at a temperature just below the build material's coalescing temperature. In a second process, a coalescing agent is "printed" or otherwise dispensed on to the build material in the desired pattern and exposed to another, relatively, higher intensity electromagnetic radiation source. This relatively higher intensity light is absorbed into the patterned coalescing agent causing the surrounding build material to coalesce. Halogen lamps emitting light over a broad spectrum may be used in both these processes.

With these 3D printing devices, higher quality of the printed 3D object can be achieved when the temperature of the building material is maintained at a predefined temperature over an entire layer of build material prior to sintering. In one example, the maintained temperature may be a temperature just below the build material's coalescing temperature. In this example, the maintained temperature may be 2° to 3° C. away from the build material's coalescing temperature. Any cooler, and the sintering of the build material may not occur, and any hotter, and sintering of the build material may not be completed correctly causing deformation of the 3D object being formed.

Some 3D printing devices may use pyrometers to measure the powder bed temperature, while other 3D printing devices may use a small thermographic camera to measure an entire surface of the powder bed or at least more points on the build material bed than could be monitored by a pyrometer.

During the printing process, temperature fluctuations within the build material bed may cause mechanical stress to be placed on the object being printed. Further, the sinterability of the build material may not be achieved in situations where insufficient levels of electromagnetic radiation is provided or the ambient temperature is too low. This results in at least a portion of a layer of the object not being formed and can cause the object to structurally and visually be deficient. Still further, too much electromagnetic radiation or too high of ambient temperature may cause the sinterable material deposited on the build material bed of the 3D printing device to prematurely sinter, and create a portion of the object that is not defined by the coalescing agent that is printed on to the build material in the desired pattern. Therefore, temperature gradients on the surface of the build material bed may result in an inferior printed object. A temperature uniformity across the build material bed of plus or minus 2° C. relative to a set control temperature will result in a structurally and visually superior 3D printed object. However, unlike previous 3D printing devices, the methods and systems described herein maintain temperature homogeneity on the build material bed.

Examples described herein provide a method and corresponding system of forming a 3D object. The method may include irradiating a build material bed with an array of lamps. The array of lamps includes a plurality of lamps. The method may also include detecting, with a thermographic camera, a temperature of a control point within at least one zone of the build material bed.

The thermographic camera relays the sensed temperature of the zones to a processor and a proportional-integral-derivative (PID) controller to determine whether the detected temperatures of the zones are outside a desired temperature value or range of values. If the detected temperatures of the zones are not outside a desired temperature value or range of values, then the temperature of the build material bed is detected again.

If, however, the detected temperatures of the zones are outside a desired temperature value or range of values, then the processor and the PID controller define a number of weights assigned to each of the plurality of lamps based on the position of the lamps within the lamp array. In one example, the defining of the weights of the lamps may be performed before or after heating or detection of the temperature of the build material bed. $K_1, K_2, \ldots K_n$ define the weights assigned for the lamps for n number of groups of lamps within the array of lamps. In one example, the weights for the lamps within in the lamp array may be defined as follows: the lamps located on corners of the array of lamps are assigned a weight of 1.0, the lamps located on sides of the array of lamps are assigned a weight of approximately between 0.7 and 0.8, and the lamps located on an interior portion of the array of lamps are assigned a weight of approximately between 0.2 and 0.4.

The PID controller provides control loop feedback and continuously calculates an error value as the difference between a desired set point such as the desired temperature of the build material bed of the 3D printing device, and a measured process variable. The above weights are input as part of the PID controller's calculations.

Examples described herein also provide a system for forming a three-dimensional object. The system includes a build material bed, and a lamp array positioned to radiate onto the build material bed. The lamp array includes a number of lamps positioned in a center of the lamp array, a number of lamps positioned on the edges of the lamp array, and a number of lamps positioned at the corners of the lamp array. The system may further include a proportional-integral-derivative (PID) controller to control power supplied to each of the lamps of the lamp array. The PID controller causes the lamp array to irradiate the build material bed, detect, with a thermographic camera, a temperature of a control point within at least one zone of the build material bed, and adjust a power level supplied to at least one of the lamps of the array of lamps if the detected temperature of the control point of the at least one zone of the build material bed is not equal to a set temperature.

The lamp array is positioned within a closed environment separate from the build material bed. Also, the thermographic camera is an infrared imaging camera to detect infrared radiation radiating from the build material bed.

Examples described herein also provide a computer program product for forming a three-dimensional object. The computer program product includes a non-transitory computer readable storage medium. The computer readable storage medium includes computer usable program code embodied therewith. The computer usable program code, when executed by a processor, detects, with a thermographic camera, a temperature of a control point within at least one zone of a build material bed, and adjusts a power level supplied to at least one of a number of lamps of an array of lamps that irradiate the build material bed if the detected temperature of the control point of the at least one zone of the build material bed is not equal to a set temperature.

The computer program product includes computer usable program code to, when executed by the processor, define a number of weights assigned to each of the lamps based on the position of the lamps within the lamp array. Lamps located on corners of the array of lamps are assigned a weight of 1, lamps located on sides of the array of lamps are assigned a weight less than 1, lamps located on an interior portion of the array of lamps are assigned a weight less than lamps located on the sides of the array of lamps. The computer program product includes computer usable program code to, when executed by the processor, adjusting the power level supplied to the lamps of the array of lamps based on the weighted levels defined for each of the lamps. In one example, the at least one zone of the build material bed comprises a plurality of zones of the build material bed.

The method may further include adjusting the power level supplied to at least one of the lamps of the array of lamps if the detected temperature of the control point of the at least one zone of the build material bed is not equal to a set temperature. This adjustment of power is performed based on the weighted levels defined for each of the plurality of lamps.

As used in the present specification and in the appended claims, the term "build material bed" or similar language is meant to be understood broadly as any substrate on which 3D object build material is deposited. In one example, the build material may be a ceramic powder. A coalescing agent may be deposited on the build material bed. The coalescing agent absorbs additional electromagnetic radiation to generate additional heat that sinters, melts, or otherwise coalesces the build material of the build material bed, allowing the build material to solidify and form the 3D object.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
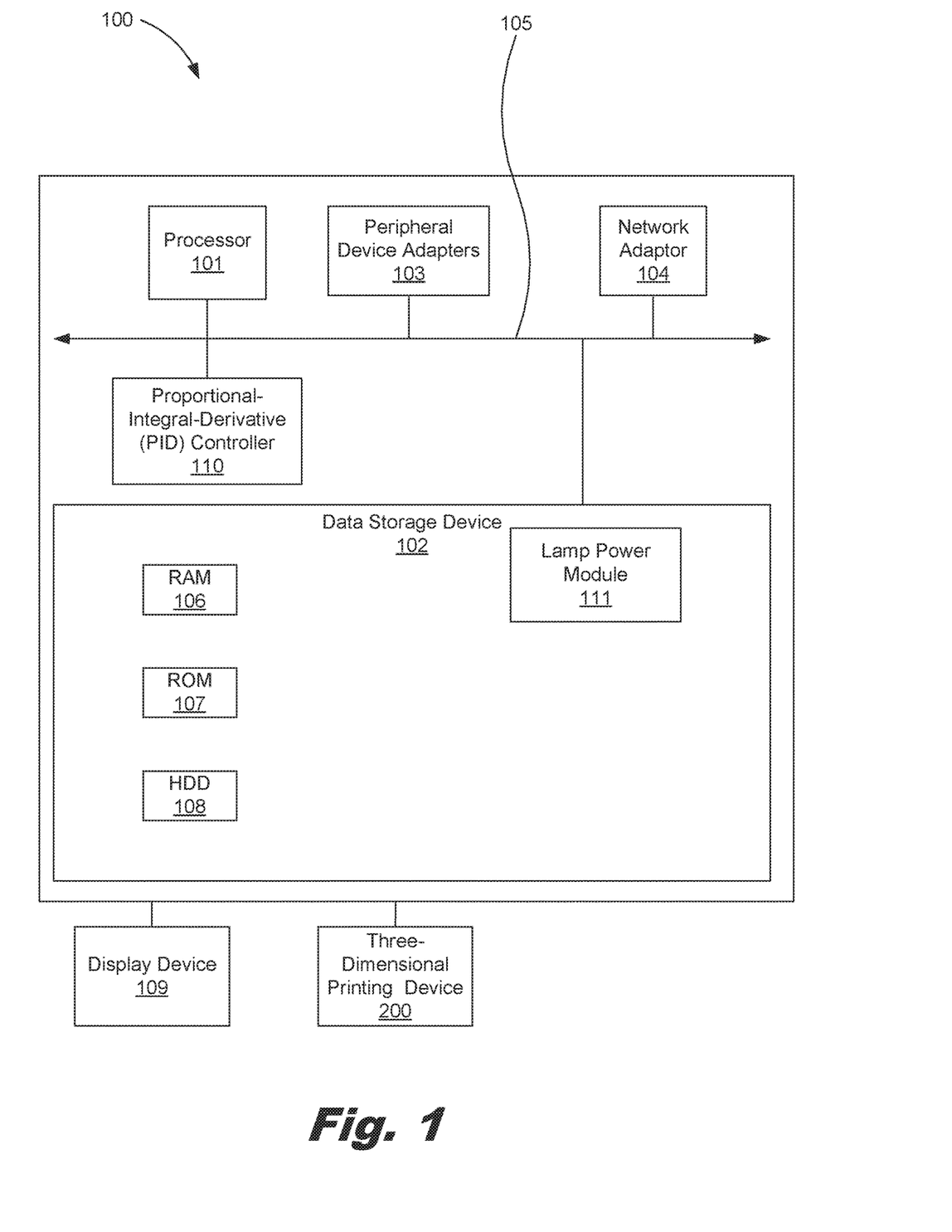
FIG. 1 is a block diagram of a computing device for forming a three-dimensional object, according to one example of the principles described herein.

Turning now to the figures FIG. 1 is a block diagram of a computing device (100) for forming a three-dimensional object, according to one example of the principles described herein. The computing device (100) may be implemented in an electronic device. Examples of electronic devices include servers, desktop computers, laptop computers, personal digital assistants (PDAs), mobile devices, smartphones, gaming systems, and tablets, among other electronic devices.

The computing device (100) may be utilized in any data processing scenario including, stand-alone hardware, mobile applications, through a computing network, or combinations thereof. Further, the computing device (100) may be used in a computing network, a public cloud network, a private cloud network, a hybrid cloud network, other forms of networks, or combinations thereof. In one example, the methods provided by the computing device (100) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing device (100) are executed by a local administrator.

To achieve its desired functionality, the computing device (100) comprises various hardware components. Among these hardware components may be a number of processors (101), a number of data storage devices (102), a number of peripheral device adapters (103), a number of network adapters (104), and a proportional-integral-derivative (PID) controller (110). These hardware components may be interconnected through the use of a number of busses and/or network connections. In one example, the processor (101), data storage device (102), peripheral device adapters (103), a network adapter (104), and PID controller (110) may be communicatively coupled via a bus (105).

The processor (101) may include the hardware architecture to retrieve executable code from the data storage device (102) and execute the executable code. The executable code may, when executed by the processor (101), cause the processor (101) to implement at least the functionality of causing a 3D printing device to irradiate a build material bed with an array of lamps, the array of lamps comprising a plurality of lamps, detect, with a thermographic camera, a temperature of a control point within at least one zone of the build material bed, and adjust a power level supplied to at least one of the lamps of the array of lamps if the detected temperature of the control point of the at least one zone of the build material bed is not equal to a set temperature, according to the methods of the present specification described herein. In the course of executing code, the processor (101) may receive input from and provide output to a number of the remaining hardware units.

The data storage device (102) may store data such as executable program code that is executed by the processor (101) or other processing device. As will be discussed, the data storage device (102) may specifically store computer code representing a number of applications that the processor (101) executes to implement at least the functionality described herein.

The data storage device (102) may include various types of memory modules, including volatile and nonvolatile memory. For example, the data storage device (102) of the present example includes Random Access Memory (RAM) (106), Read Only Memory (ROM) (107), and Hard Disk Drive (HDD) memory (108). Many other types of memory may also be utilized, and the present specification contemplates the use of many varying type(s) of memory in the data storage device (102) as may suit a particular application of the principles described herein. In certain examples, different types of memory in the data storage device (102) may be used for different data storage needs. For example, in certain examples the processor (101) may boot from Read Only Memory (ROM) (107), maintain nonvolatile storage in the Hard Disk Drive (HDD) memory (108), and execute program code stored in Random Access Memory (RAM) (106).

Generally, the data storage device (102) may comprise a computer readable medium, a computer readable storage medium, or a non-transitory computer readable medium, among others. For example, the data storage device (102) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (103, 104) in the computing device (100) enable the processor (101) to interface with various other hardware elements, external and internal to the computing device (100). For example, the peripheral device adapters (103) may provide an interface to input/output devices, such as, for example, display device (109), a 3D printing device (200), a mouse, or a keyboard. The peripheral device adapters (103) may also provide access to other external devices such as an external storage device, a number of network devices such as, for example, servers, switches, and routers, client devices, other types of computing devices, and combinations thereof.

The PID controller (110) is a control loop feedback mechanism or controller used in industrial control systems, and it is used here to adjust the temperature of a build material bed (FIGS. 2 and 3, 205) of the 3D printing device (200) in both a single point temperature control mode and a multi-zone temperature close loop control mode. In one example, the PID controller (110) is used to adjust the temperature of a build material deposited on the build material bed FIGS. 2 and 3, 205). As described above, the build material is to be maintained at a target temperature just below the build material's coalescing temperature, which, in one example, may be 2° to 3° C. away from the build material's coalescing temperature.

For both the single point temperature control mode and a multi-zone temperature close loop control mode, the PID controller (110) is used to determine how power supplied to a number of lamps within the 3D printing device (200) is to be adjusted. The PID controller (110) continuously calculates an error value as the difference between a desired set point such as the desired temperature of the build material bed of the 3D printing device (200), and a measured process variable. The PID controller (110) minimizes the error over time by adjustment of a control variable, such as the power (in volts) supplied to a number of lamps within an array of lamps within the 3D printing device (200), to a new value determined by a weighted sum as follows:

$$u(t) = K_p e(t) + K_i \int_0^t e(\tau)d\tau + K_d \frac{de(t)}{dt} \qquad \text{Eq. 1}$$

where $K_p$, $K_i$, and $K_d$, all non-negative, denote the coefficients for the proportional, integral, and derivative terms, respectively, and sometimes denoted P, I, and D. In this model, "P" accounts for present values of the error. For example, if the error is large and positive, the control output will also be large and positive. "I" accounts for past values of the error. For example, if the current output is not sufficiently strong, error will accumulate over time, and the controller will respond by applying a stronger action. "D" accounts for possible future values of the error, based on its current rate of change.

The single point temperature control mode controls the lamps of the 3D printing device (200) are controlled as a whole using Equation 1 to determine a change in power of the lamps as an array to affect the temperature of the build material bed as if the entirety of the build material bed was a single zone.

As to the multi-zone temperature close loop control mode, however, the PID controller (110) utilizes Equation 1 above to affect the temperature of a plurality of logically-divided zones of the build material bed individually by adjusting the power level of a number of lamps individually or as groups assigned to a particular zone. In one example, each lamp or group of lamps in the 3D printing device (200) may be controlled by a temperature detected at a zone located below the lamp or group of lamps. Equation 2, below, is applied for each zone based on a temperature detected by a thermographic camera below the respective lamp or group of lamps. Thus, in the multi-zone temperature close loop control mode, the power for each of the lamps in the 3D printing device (200) may be controlled by Equation 2 as follows:

$$\text{LampVoltage}=K_1(Eq1 \text{ for zone 1})+K_2(Eq1 \text{ for zone 2})+\ldots K_n(Eq1 \text{ for zone } n) \qquad \text{Eq. 2:}$$

where $K_1, K_2, \ldots K_n$ are weights that depend on the amount of radiation that each zone receives from each lamp. If a particular lamp is located directly above a particular zone, this coefficient is higher relative to a lamp that is not located directly above the particular zone. Thus, the farther away a lamp is from the particular zone, the lower that lamp's influence as to that particular zone, and, therefore, the lower the coefficient.

The weights of $K_1, K_2, \ldots K_n$ may be defined as a number of weights assigned to each of the plurality of the lamps of the 3D printing device (200) based on, for example, the level of radiation that each zone logically defined on the build material bed of the 3D printing device (200) receives from a particular lamp or group of lamps. If the number of logically-defined zones in the build material bed equal the number of lamps of the 3D printing device (200), then a one-to-one correspondence between the lamps and the zones may be assigned where one zone is assigned a lamp located above that zone. If the number of lamps is greater than the number of logically-defined zones, then a group of lamps that are located above a particular zone may be assigned to that particular zone. In one example, the weights for the lamps within a lamp array may be defined as follows: lamps located on corners of the array are assigned a weight of 1, lamps located on sides of the array are assigned a weight less than 1, and lamps located on an interior portion of the array are assigned a weight less than lamps located on the sides of the array of lamps.

Further, in one example, the lamps located on corners of the array may be assigned a weight of 1.0, the lamps located on sides of the array may be assigned a weight of approximately between 0.7 and 0.8, and the lamps located on an interior portion of the array of lamps may be assigned a weight of approximately between 0.2 and 0.4. In another example, the lamps located on corners of the array may be assigned a weight of 1.0, the lamps located on sides of the array may be assigned a weight of approximately between 0.7 and 0.8, and the lamps located on an interior portion of the array of lamps may be assigned a weight of approximately between 0.05 and 0.4. Adjustment of the power level individually supplied to the lamps is based on the weighted levels defined for each of the plurality of lamps. As used in the present specification and in the appended claims, the term "approximately" or similar language is meant to be understood broadly in connection with the above weights as the described weights plus or minus ($\pm$) 0.5.

The power levels adjusted for the lamps may be based on a root-mean-square (RMS) voltage that cuts a fixed sinusoidal tension of the voltage signal. In this example, a constant current (cc) voltage is cut using pulse-width modulation (PWM) to achieve a desired output RMS signal. In one example, a variable cc voltage level, a variable sinusoidal amplitude level, or other current control methods such as current control via a variable resistor may be used to achieve a target power level output to the lamps.

As a PID controller (110) relies on the measured process variable, and not on knowledge of the underlying process, it is broadly applicable. By tuning the three parameters of the model, the PID controller (110) may deal with specific process requirements. The response of the PID controller (110) may be described in terms of its responsiveness to an error, the degree to which the system overshoots a set point, and the degree of any system oscillation.

In one example, the computing device (100) may be coupled to the 3D printing device (200) via a network connection, or may be coupled to the 3D printing device (200) directly. In another example, the computing device (100) may be part of the 3D printing device (200). In this example, the elements of the computing device (100) may be included within the 3D printing device (200) to form a single computing-enabled device. Thus, the computing device (100) and the 3D printing device (200) may be incorporated into the same device.

The display device (109) may be provided to allow a user of the computing device (100) to interact with and implement the functionality of the computing device (100). The peripheral device adapters (103) may also create an interface between the processor (101) and the display device (109), a printer, or other media output devices. The network adapter (104) may provide an interface to other computing devices within, for example, a network, thereby enabling the transmission of data between the computing device (100) and other devices located within the network.

The computing device (100) may, when executed by the processor (101), display the number of graphical user interfaces (GUIs) on the display device (109) associated with the executable program code representing the number of applications stored on the data storage device (102). The GUIs may include aspects of the executable code. The GUIs may display, for example, a 3D model of an object generated with, for example, a CAD computer program product as a representation of a physical object to be printed by the 3D printing device (200). Additionally, via making a number of interactive gestures on the GUIs of the display device (109), a user may prepare data representative of the object and instruct the 3D printing device (200) to print the object. Examples of display devices (109) include a computer screen, a laptop screen, a mobile device screen, a personal digital assistant (PDA) screen, and a tablet screen, among other display devices (106). The 3D printing device (200) will be described in more detail below.

The computing device (100) further comprises a number of modules used in the implementation of the methods and systems described herein. The various modules within the computing device (100) comprise executable program code that may be executed separately. In this example, the various modules may be stored as separate computer program products. In another example, the various modules within the computing device (100) may be combined within a number of computer program products; each computer program product comprising a number of the modules.

The computing device (100) may include, for example, a lamp power module (111) to, when executed by the processor (101), adjust a power level supplied to at least one of the lamps of the array of lamps if the detected temperature of the control point of the at least one zone of the build material bed is not equal to a set temperature. In one example, the adjustment of power is based on the control loop feedback provided by the PID controller (110). In this manner, when the temperature of the build material bed is not equal to a desired temperature, the processor (101) executes the lamp power module (111), and, based on the control loop feedback provided by the PID controller (110), adjusts an amount of power provided to all the lamps, a group of lamps within the array, or a single lamp.

Figure 2:
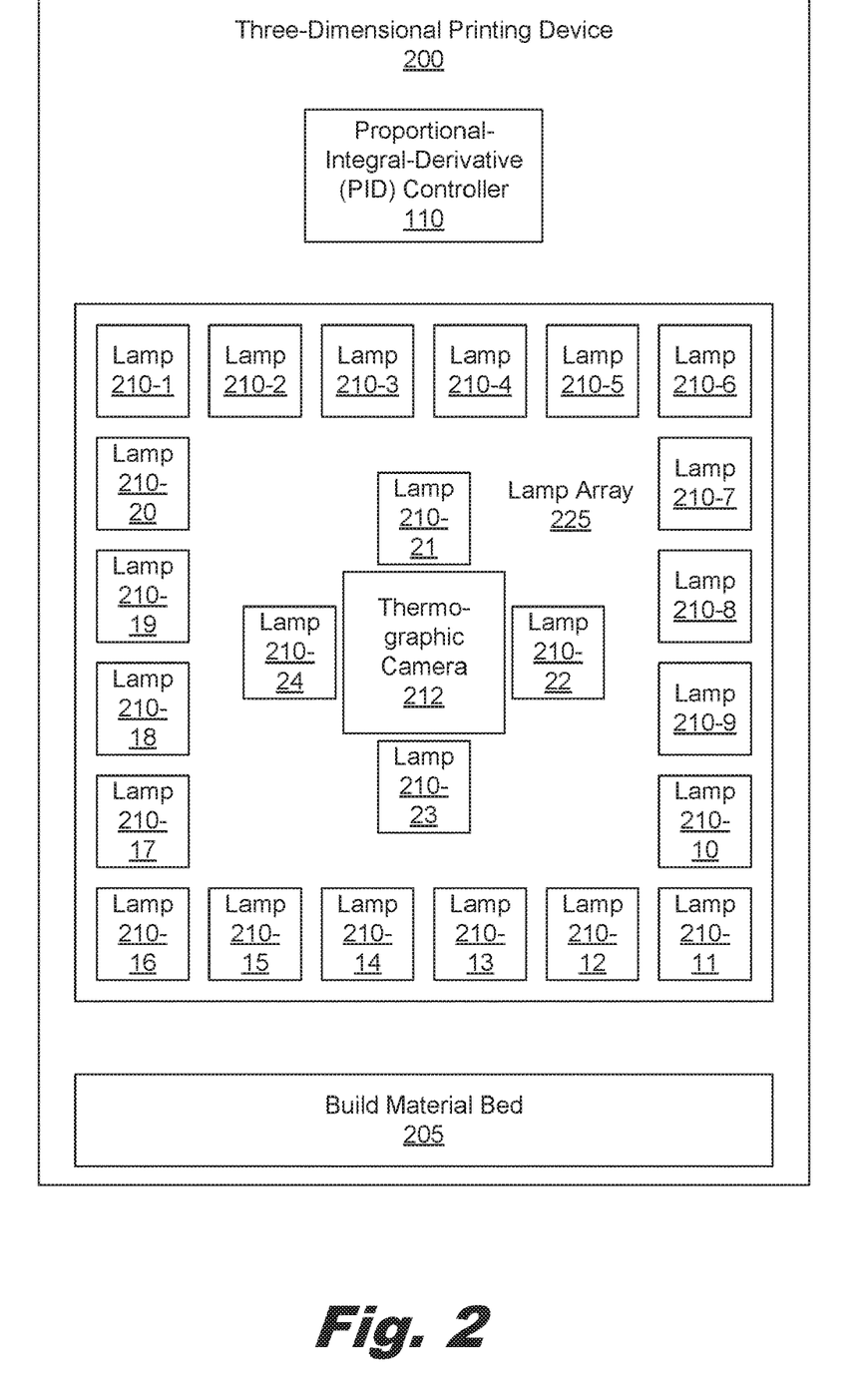
FIG. 2 is a block diagram of a three-dimensional (3D) printing device, according to one example of the principles described herein.
Figure 3:
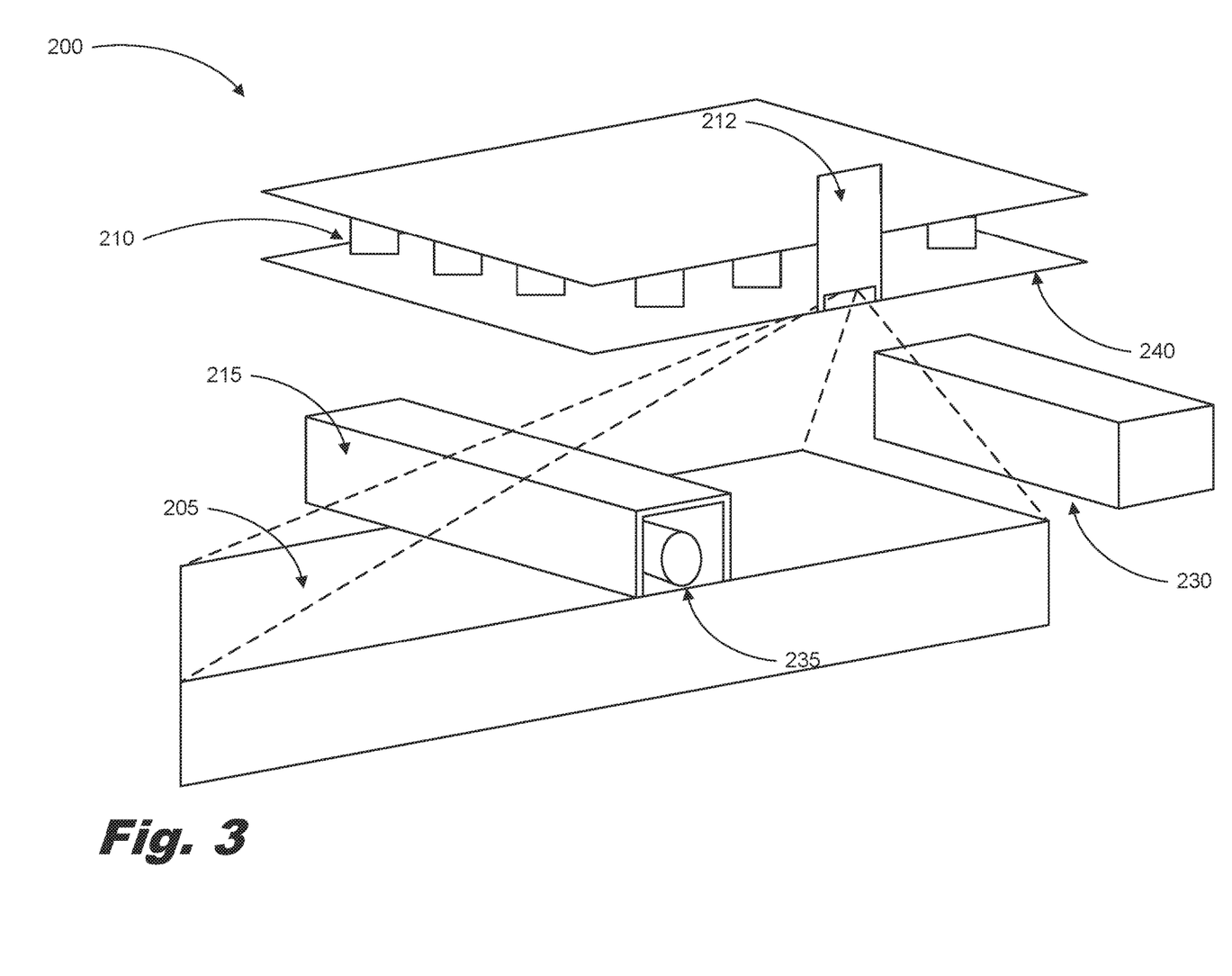
FIG. 3 is an isometric cut-away view of a three-dimensional (3D) printing device according to an example of the principles described herein.

The 3D printing device (200) of FIGS. 2 and 3 will now be described. FIG. 2 is a block diagram of a 3D printing device (200), according to one example of the principles described herein. Further, FIG. 3 is an isometric cut-away view of a 3D printing device (200) according to an example of the principles described herein. In one example, the 3D printing device (200) the PID controller (110) instead of the computing device (100).

The 3D printing device (200) includes a build material bed (205). The build material bed (205) may be any type of substrate onto which a build material such as a sinterable material is layered. As mentioned above, the build material bed (205) may accommodate any number of layers of build material and coalescing agent: a layer of each deposited on the build material bed (205) at a time in order to form different layers of the 3D object. In an example, a number of build material supply receptacles may be positioned alongside the build material bed (205). A build material layering device (215) may receive an amount of build material from the build material supply receptacles and deposit a first or a new layer of build material onto the build material bed (205). Thus, as used in the present specification and in the appended claims, the term "build material bed" or similar language is meant to be understood broadly as any substrate on which 3D object build material is deposited.

The 3D printing device (200) includes a lamp array (225). The lamp array (225) includes a number of lamps (210-1 through 210-24), collectively referred to herein as lamps (210). The lamps (210) may include any number of devices that emit electromagnetic radiation to provide heat to the build material bed (205). In one example, the lamps (210) may be infrared (IR) lamps that emit electromagnetic radiation in the infrared wavelengths of between 700 nanometers and 1 millimeter wavelengths. In one example, the lamps (210) of the lamp array (225) are contained in a housing including a top portion and a pane of glass (240) through which the electromagnetic radiation from the lamps (210) is projected. The pane of glass (240) separates the lamps (210) from the interior of the 3D printing device (200). Further, in one example, the lamp array (225), within the housing, may be exposed to a dedicated refrigeration system to keep the lamps (210) cool during operation, but to also separate the cold air provided by the refrigeration system away from the interior of the 3D printing device (200) and the build material bed (205) in order to maintain a regulated temperature within the printing area of the 3D printing device (200) while still being able to cool the lamps (210) within a segregated environment.

A thermographic camera (212) may be coupled to the lamp array (225). In one example, the thermographic camera (212) is coupled to a center portion of the lamp array (225). A central position of the thermographic camera (212) among the lamps (210) of the lamp array (225) provides for homogeneous heating of the build material bed (205) and the layer of build material disposed thereon. Further, a central position of the thermographic camera (212) among the lamps (210) of the lamp array (225) provides for a more efficient and encompassing detection and measurement of a temperature profile present on the build material bed (205) since the thermographic camera (212) is able to image the entirety of the build material bed (205) from a directly angled position. In this example, the lamps (210) are position such that the lamps (210) may precisely heat the layer of build material on the build material bed (205) including a central portion of the build material bed (205) that is not covered by a lamp (210) directly but is occupied by the thermographic lamp (212).

In other examples, however, the thermographic camera (212) may be positioned anywhere within the 3D printing device (200). The thermographic camera (212) may be any type of camera that can detect electromagnetic radiation such as infrared radiation emitting from, for example, at least one portion of the build material bed (205). Any number of thermal cameras may be used to detect the whole or a portion of the entire surface of the build material bed (205). In an example, the thermographic camera (212) detects electromagnetic radiation emitting from the build material bed (105) having wavelengths up to 14,000 nm. In this example, the camera continuously detects this emitted infrared radiation along the entirety of the build material bed (105). In an example, an array of pyrometers may be used instead of a thermographic camera (212) with each pyrometer detecting the emissivity of a single point on the surface of the build material bed (205). In this example, the number of pixels of temperature data may depend on the number of pyrometers in the array. In another example, the pyrometers may be used in conjunction with the thermographic camera (212) to obtain temperatures of a number of zones of the build material bed (205). In still another example, a plurality of thermographic cameras (212) may be used to obtain temperatures of a number of zones of the build material bed (205). In yet another example, a single thermographic camera (212) may be used to obtain temperatures of a number of zones of the build material bed (205).

Referring to FIG. 3, the 3D printing device (200) includes the build material bed (205), the thermographic camera (212), a build material layering device (215) with a roller (235), a number of lamps (210), and a printhead (230). The interaction between each of these will now be described in more detail.

During operation, the thermographic camera (212) may be continually monitoring the temperature of the build material bed (205). The thermographic camera (212) is monitoring the infrared radiation emitted by the build material bed (205) as the build material bed (205) is heated up by the lamps (210) to a temperature of between 2° to 3° C. below a build materials' coalescing temperature. In one example, the thermographic camera (212) may also monitor the infrared radiation emitted by the build material as well as the build material is heated up by the lamps (210). The build material layering device (215) progresses over the build material bed (205). The build material layering device (215) passes over every portion of the build material bed (205) and places a layer of build material onto the build material bed (205). The roller (235) rolls out or flattens the build material along the surface of the build material bed (205) in order to achieve even coverage of build material along the entire surface of the build material bed (205).

As mentioned above, the printhead (230) may also pass across the entirety of the build material bed (205) in order to deposit a coalescing agent onto the surface of a first or newly formed layer of build material. In an example, the coalescing agent absorbs additional energy from a number of electromagnetic radiation emitting lights on the printhead (230). As this additional energy is absorbed by the coalescing agent, the coalescing agent begins to heat any surrounding build material to a temperate equal to or above the build materials' coalescing temperature. This melts, sinters, or otherwise coalesces the build material causing a portion of the 3D object to be formed.

The function of the lamp array (225) in the 3D printing device (200) is to set the non-printed portion build material bed to a certain temperature. Turning again to both FIGS. 2 and 3, the lamp array (225) may include any number of lamps (210). In FIG. 2, 24 lamps (210) are depicted. However, any number of lamps (210) may be included in the lamp array (225) in order to heat the build material bed (205). The number and arrangement of the lamps (210) in the lamp array (225) is calculated to provide a homogenous radiation over the surface of the build material bed (205) taking into account that the lamps (210) may be powered at different power levels. Thus, the 3D printing device (200) may include a lamp array (225) that includes a different arrangement and positioning of lamps (210) based on, for example, the size of the build material bed (205). In one example the lamps (210-21, 210-22, 210-23, 210-24) located relatively closer to the center of the lamp array (225) may operate at relatively lower power levels than lamps (210-1 through 210-20) on the outer edge of the lamp array (225) that may operate at relatively higher power levels. This is because the center of the build material bed (205) receives radiation from all the lamps (210) while the outer edges of the build material bed (205) receive radiation from the lamps (210-1 through 210-20) positioned directly above that area of the build material bed (205). In one example, and as will be described in more detail below, the lamps (210) may be assigned a weighted factor that defines how a change in power with respect to the lamps (210) effects a particular lamp (210). For example, lamps (210) located on corners of the array of lamps (225) may be assigned a weight of 1, lamps (210) located on sides of the array of lamps (225) may be assigned a weight less than 1, and lamps (210) located on an interior portion of the array of lamps (225) are assigned a weight less than lamps (210) located on the sides of the array of lamps (225). Adjusting the power level supplied to the lamps (210) of the array of lamps (225) may be based on the weighted levels defined for each of the plurality of lamps (210)

As mentioned above, the feedback for the control of the lamps (210) is provided by the thermographic camera (212) situated either near or within the lamp array (225). Also, as mentioned above, a single thermographic camera (212) located at the center of the lamp array (225) as depicted in FIG. 2 may be enough. However, in one example, a number of thermographic cameras (212) may also be located at the sides of the lamp array (225) to detect temperatures of the outer portions of the build material bed (205).

Figure 4:
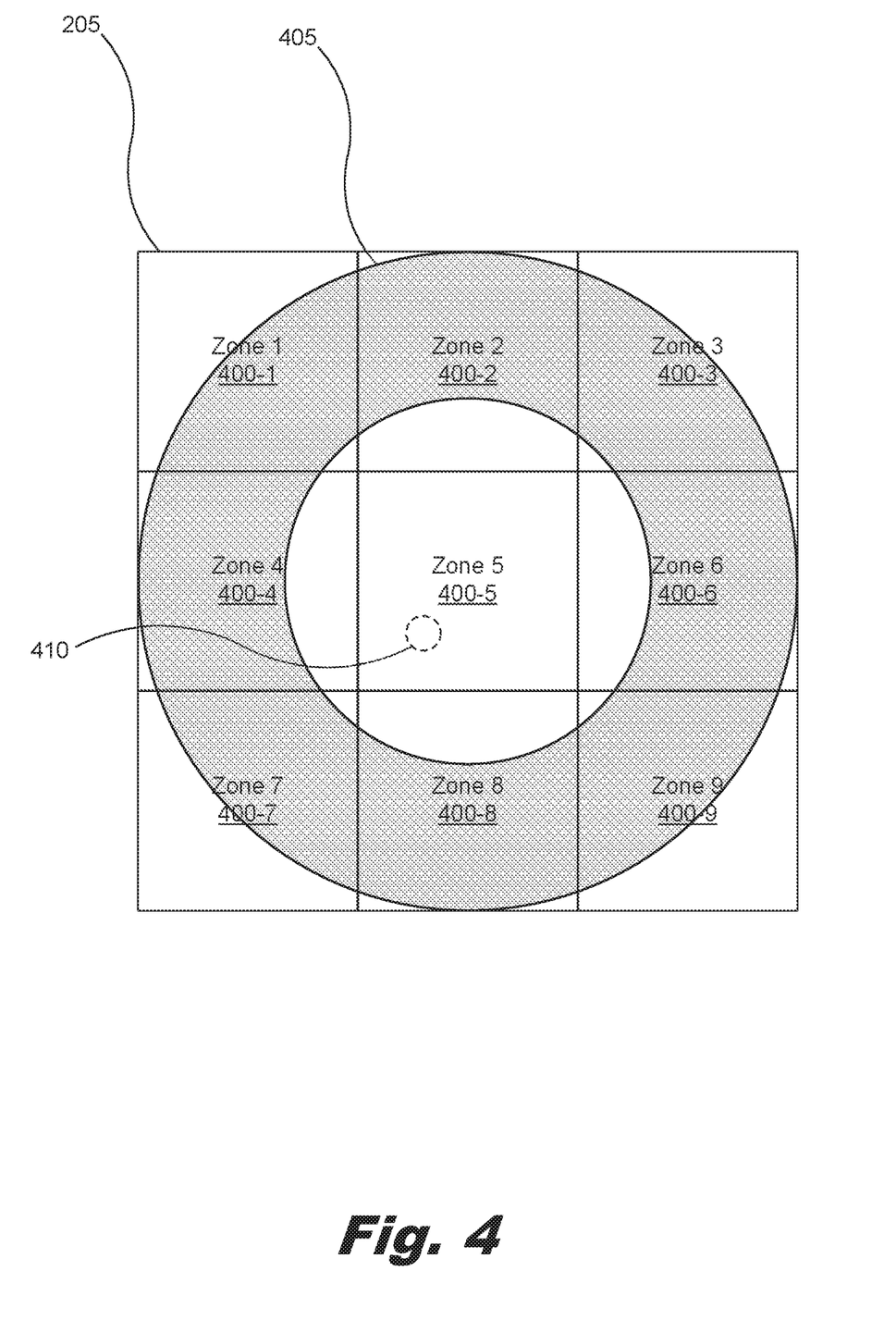
FIG. 4 is a top view block diagram of a build material bed of the 3D printing device of FIGS. 2 and 3, according to one example of the principles described herein.

FIG. 4 is a top view block diagram of a build material bed (205) of the 3D printing device (200) of FIGS. 2 and 3, according to one example of the principles described herein. FIG. 4 depicts a 3D object (405) being printed on the build material bed (205). In the example of FIG. 4, the 3D object (405) includes a torus shape. When forming the 3D object, portions of the build material bed (205) may not be printed on. These non-printed portions are used by the 3D printing device (200) and the computing device (100) to maintain a homogenous temperature along the surface of the build material bed (205).

In one example, the build material bed (205) may be logically divided into a number of different zones (400-1 through 400-9), collectively referred to herein as zones (400). Nine zones (400) are depicted in FIG. 4. However, fewer or more zones (400) may logically divide the surface of the build material bed (205). In one example, the number of zones is user-definable. Further, in one example, the number of zones is equivalent to the number of lamps (210) in the lamp array (225). Temperature readings from the different zones (400) may be used to determine what portion or portions of the build material bed (205) have a temperature that is outside a desired temperature value or range of values. In a multi-zone temperature close loop control system, the build material bed (205) is logically divided into the zones (400) as depicted in FIG. 4, and the temperature of each of the zones (400) is influenced by the radiation emitted by different lamps (210) in the lamp array (225). In one example, the closer a particular lamp (210) is to a particular zone (400), the more influence that particular lamp (210) has regarding the temperature of that particular zone (400). A multi-zone temperature close loop control system may be defined in this manner, and the power level and, as a result, the level of electromagnetic radiation emitted, of each lamp (210) may be defined by the PID controller (110) based on a number of weights assigned to each of the lamps (210) and for each of the zones (400). In one example, each lamp (210) or group of lamps may be controlled based on a detected temperature of the zone (400) or zones below the lamp (400) or group of lamps.

A number of control points (410) may be selected and defined along the surface of the build material bed (205). The control point (410) may be any point on the build material bed (205) that is not printed on. Thus, the control points that are selected for use as temperature close loop control points will be the non-printed portions of the build material bed (205). Although the temperatures of the printed areas of the build material bed (205) may be of use for other heat control systems in the 3D printing device, the temperature of the build material itself or the printed areas in general are not used in connection with lamp array (225).

Figure 5:
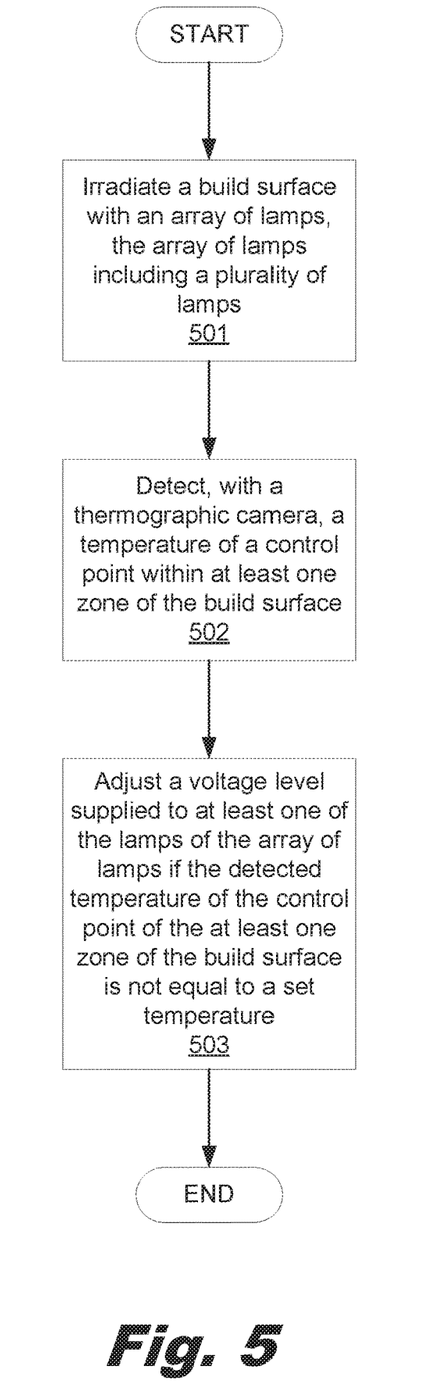
FIG. 5 is a flowchart showing a method of forming a 3D object, according to one example of the principles described herein.

FIG. 5 is a flowchart showing a method of forming a 3D object, according to one example of the principles described herein. The method of FIG. 5 may begin by irradiating (block 501) the build material bed (205) with an array (225) of lamps (210). The array (225) of lamps (210) includes a plurality of lamps (210). The method may also include detecting (block 502), with a thermographic camera (212), a temperature of a control point (410) within at least one zone (400) of the build material bed (205). A power level supplied to at least one of the lamps (210) of the array of lamps (225) may be adjusted (block 503) if the detected temperature of the control point 410) of the at least one zone (400) of the build material bed (205) is not equal to a set temperature. More details regarding the method of FIG. 5 will now be described in connection with FIG. 6.

Figure 6:
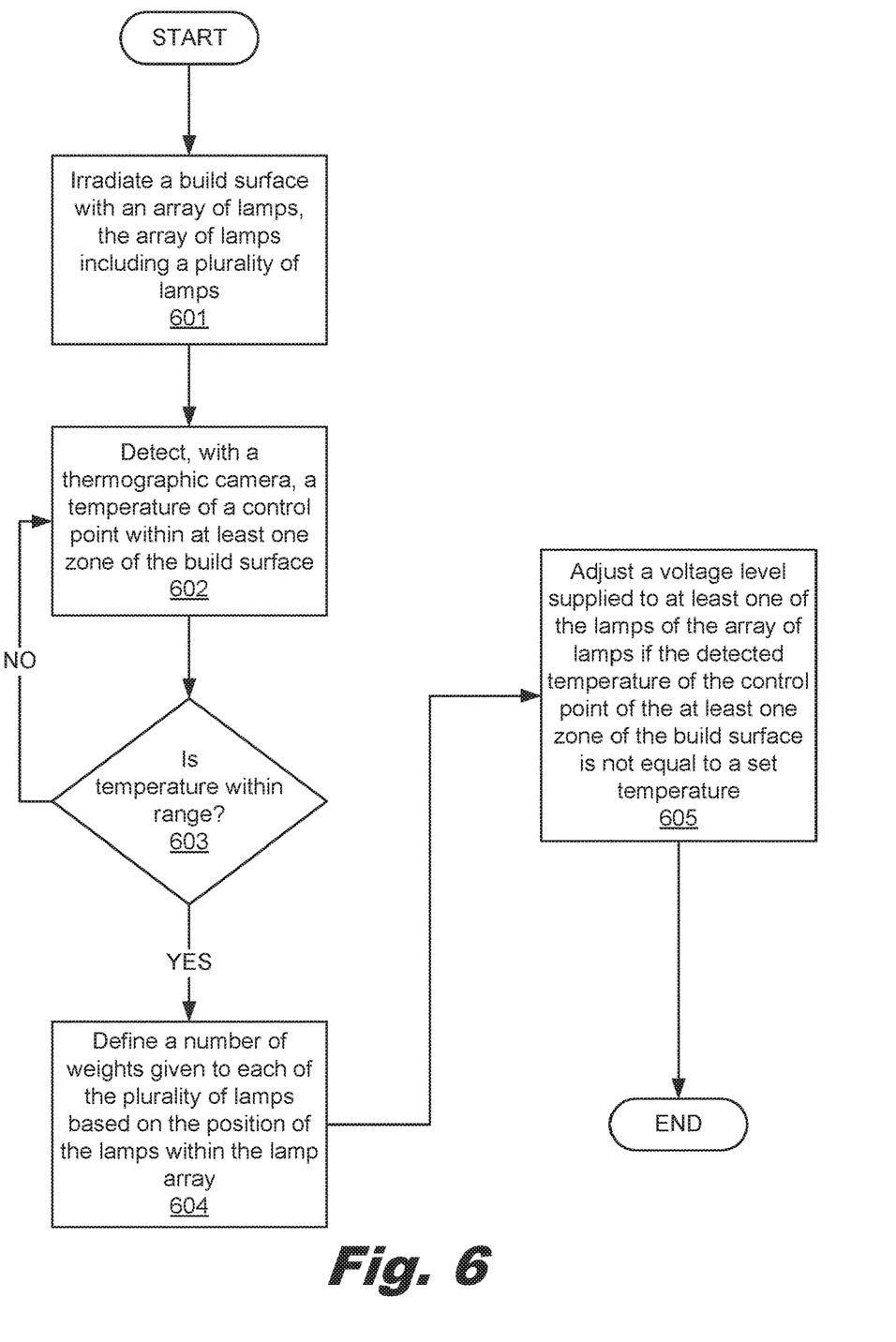
FIG. 6 is a flowchart showing a method of forming a 3D object, according to another example of the principles described herein.

FIG. 6 is a flowchart showing a method of forming a 3D object, according to another example of the principles described herein. The method of FIG. 6 may begin by irradiating (block 601) the build material bed (205) with an array (225) of lamps (210). The array (225) of lamps (210) includes a plurality of lamps (210). The method may also include detecting (block 602), with a thermographic camera (212), a temperature of a control point (410) within at least one zone (400) of the build material bed (205).

The thermographic camera (212) relays the sensed temperature of the zones (400) to the processor (101) and the PID controller (110) to determine (block 603) whether the detected temperatures of the zones (400) are outside a desired temperature value or range of values. If the detected temperatures of the zones (400) are not outside a desired temperature value or range of values (block 603, determination NO), then the method loops back to block 602 to detect the temperature again. In this manner, the temperature of the build material bed (205) is continuously being sensed and analyzed.

If, however, the detected temperatures of the zones (400) are outside a desired temperature value or range of values (block 603, determination YES), then the processor (101) and the PID controller (110) define (block 604) a number of weights assigned to each of the plurality of lamps (210) based on the position of the lamps (210) within the lamp array (225). In one example, the defining (block 604) of the weights of the lamps (210) may be performed before or after blocks 601, 602, or 603, and may even be performed offline. As described above, the lamp array (225) may include any number of lamps (210) arranged in any number or type of arrangement. However, in one example, the lamps (210) may be assigned a weighted factor that defines how a change in power with respect to the lamps (210) effects a particular lamp (210). As a general matter, in order to have a uniform radiation, and in order to obtain a resultant homogenously heated build material bed (205), each lamp (210) is to be powered at a certain power level. Thus, in one example, lamps (210) located on corners of the array of lamps (225) may be assigned a weight of 1, lamps (210) located on sides of the array of lamps (225) may be assigned a weight less than 1, and lamps (210) located on an interior portion of the array of lamps (225) are assigned a weight less than lamps (210) located on the sides of the array of lamps (225).

This type of weighting scheme that provides relative power levels between the lamps (210) takes into account the idea that the center area of the build material bed (205) receives electromagnetic radiation from all the lamps (210) within the lamp array (225), while the edges of the build material bed (205) receive electromagnetic radiation primarily from the corner and edge lamps such as lamps (210-1 through 210-20), and not so much from the lamps (210) that are interior to the corners and sides of the lamp array (225) such as lamps (210-21, 210-22, 210-23, 210-24). Thus, the lamps (210) that are interior to the corners and sides of the lamp array (225) such as lamps (210-21, 210-22, 210-23, 210-24) are weighted at a level that is lower than the lamps (210) located at the corners and sides of the lamp array (225) such as lamps (210-1 through 210-20).

In one example, the weights for the lamps (210) within in the lamp array (225) may be defined as follows: the lamps (210) located on corners of the array of lamps (225) are assigned a weight of 1.0, the lamps (210) located on sides of the array of lamps (225) are assigned a weight of approximately between 0.7 and 0.8, and the lamps (210) located on an interior portion of the array of lamps (225) are assigned a weight of approximately between 0.2 and 0.4. As used in the present specification and in the appended claims, the term "approximately" or similar language is meant to be understood broadly in connection with the above weights as the described weights plus or minus (±) 0.5.

As mentioned above, the PID controller (110) provides control loop feedback and continuously calculates an error value as the difference between a desired set point such as the desired temperature of the build material bed (205) of the 3D printing device (200), and a measured process variable. The above weights are input as part of the PID controller's calculations.

The method of FIG. 6 may continue with adjusting (block 605) the power level supplied to at least one of the lamps (210) of the array of lamps (225) if the detected temperature of the control point (410) of the at least one zone (400) of the build material bed (205) is not equal to a set temperature. At block 605, the adjustment is performed based on the weighted levels defined for each of the plurality of lamps (210). Also, the set temperature is somewhere just below the build material's coalescing temperature.

In one example the control point (410) may be defined previous to the execution of blocks 601 through 605 of FIG. 6. The control point (410) may be defined based on the CAD model or other digital representation of the 3D object (405) to be printed. In this example, a number of non-printed areas of the build material bed (205) may be determined from the digital representation of the 3D object (405), and one of these areas may be selected as the control point (410). Thus, the non-printed areas of the build material bed (205) may be defined by print data Further, during and after the printing of the 3D object (405), the processor (101) may adjusting the control point (410) to a different control point within at least one zone (400) of the build material bed.

In another example related to block 604 of FIG. 6, adjusting a power level supplied to at least one of the lamps (210) of the array of lamps (225) may be based on a weight assigned to each of the zones (400). Thus, in one example, the processor (101) and PID controller (110) may define a weight to each of the zones (400), and control the temperature of each of the zones (400) by controlling the power to the lamps (210). In this example, the influence a particular lamp (210) has on the temperature of a particular zone (400) is based on proximity of the particular lamp (210) to the particular zone (400).

Further, in this example, defining a number of weights assigned to each of the zones (400) based on the position of the zones (400) within the build material bed (205) may be defined as follows: zones (400) located on corners of the build material bed (205) are assigned a weight of 1, zones (400) located on sides of the build material bed (205) are assigned a weight less than 1, and zones (400) located on an interior portion of the build material bed (205) are assigned a weight less than zones (400) located on the sides of the build material bed. The power level supplied to the at least one of the lamps (210) of the array of lamps (225) may then be based on the weighted levels defined for each of the plurality of zones (400).

In FIGS. 5 and 6, adjustment of power levels of the lamps (400) may be made independent of all other lamps (400). In this example, the lamp array (225) acts achieve a temperature target for the zones (400) over which the lamps (210) are located. Thus, each lamp (210) is able to be controlled independent of the other lamps (210). In one example, a plurality of lamps (210) may be assigned to or otherwise effect the temperature within a given zone (400). In this example, the lamps (210) that may affect the temperature of a given zone (400) work in concert to achieve the desired temperature in the given zone (400).

In one example of FIGS. 5 and 6 where the single point temperature control mode is being executed, the weights set for the various lamps (400) may define a lamp array profile that causes all the lamps (400) within the lamp array (225) to be adjusted as a whole or together based on the lamp array profile. In this example, if the temperature of the build material bed (205) is outside the desired temperature range, then the adjustment of the power levels of the lamps (210) follows the lamp array profile.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (101) and/or PID controller (110) of the computing device (100) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of forming a three-dimensional (3D) object comprising:
    irradiating a build material bed with an array of lamps, the array of lamps comprising a plurality of lamps;
    detecting, with a thermographic camera, a temperature of a control point within at least one zone of the build material bed; and
    adjusting a power level supplied to at least one of the lamps of the array of lamps when the detected temperature of the control point of the at least one zone of the build material bed is not equal to a set temperature, wherein adjusting the power level supplied comprises:
    assigning a weight to each of the plurality of lamps based on a position of each lamp within the lamp array, with lamps at different positions within the array having different assigned weights; and
    adjusting the power level supplied to each individual lamp based on a respective weight assigned to that individual lamp.

2. The method of claim 1, wherein:
    lamps located on corners of the array of lamps are assigned a weight of 1;
    lamps located on sides of the array of lamps are assigned a weight less than 1; and
    lamps located on an interior portion of the array of lamps are assigned a weight less than lamps located on the sides of the array of lamps.

3. The method of claim 2, wherein K1, K2, ... Kn define the weights assigned for the lamps for n number of groups of lamps within the array of lamps.

4. The method of claim 1, comprising adjusting the control point to a different control point within at least one zone of the build material bed.

5. The method of claim 1, wherein the control point is a non-printed surface of the build material bed.

6. The method of claim 1, wherein the location of the control point is defined based on a digital representation of the 3D object.

7. The method of claim 1, further comprising, when a number of lamps in the array of lamps equals a number of heating zones, assigning each lamp to a zone with a one-to-one correlation.

8. The method of claim 1, further comprising, when a number of lamps in the array of lamps is greater than a number of heating zones, assigning a group of multiple lamps to a zone.

9. The method of claim 1, wherein:
    lamps located on corners of the array of lamps are assigned a weight of 1;
    lamps located on sides of the array of lamps are assigned a weight of 0.7 to 0.8; and
    lamps located on an interior portion of the array of lamps are assigned a weight of 0.2 to 0.4.

10. The method of claim 1, wherein adjusting the power level supplied comprises cutting a constant current using pulse-width modulation to achieve a predetermined root-mean-square voltage signal.

11. A system for forming a three-dimensional object comprising:
    a build material bed;
    a lamp array positioned to radiate onto the build material bed, the lamp array comprising:
    a number of lamps positioned in a center of the lamp array;
    a number of lamps positioned on edges of the lamp array; and
    a number of lamps positioned at corners of the lamp array; and
    a thermographic camera centrally positioned within the lamp array; and
    a controller to control power supplied to each of the lamps of the lamp array, the controller adjusting power supplied to each of the lamps when the thermographic camera indicates a temperature of the build material bed is not a set temperature, wherein an adjustment to power supplied to each lamp in the array is based on a position of that lamp within the array, lamps at different positions within the array receiving different adjustments to power,
    wherein the lamps positioned in the center of the lamp array are assigned a first weight, lamps positioned on the edges of the lamp array are assigned a second, different weight and lamps positioned at the corners of the lamp array are assigned a third, different weight, the controller to apply a different adjustment to power supplied to each lamp based on the weight assigned to that lamp.

12. The system of claim 11, wherein:
    lamps located on corners of the array of lamps are assigned a weight of 1;
    lamps located on sides of the array of lamps are assigned a weight less than 1; and
    lamps located on an interior portion of the array of lamps are assigned a weight less than lamps located on the sides of the array of lamps.

13. The system of claim 12, wherein:
    lamps located on corners of the array of lamps are assigned a weight of 1;
    lamps located on sides of the array of lamps are assigned a weight of 0.7 to 0.8; and
    lamps located on an interior portion of the array of lamps are assigned a weight of 0.2 to 0.4.

14. A computer program product for forming a three-dimensional object, the computer program product comprising:
    a non-transitory computer readable storage medium comprising computer usable program code embodied therewith, the computer usable program code to, when executed by a processor:

detecting, with a thermographic camera, a temperature of a control point within at least one zone of a build material bed; and adjusting a power level supplied to each of a plurality of lamps of an array of lamps that irradiate the build material bed when the detected temperature of the control point of the at least one zone of the build material bed is not equal to a set temperature, wherein adjusting the power level supplied comprises:

assigning a weight to each of the plurality of lamps based on a position of each lamp within the lamp array, with lamps at different positions within the array having different assigned weights; and adjusting the power level supplied to each individual lamp based on a respective weight assigned to that individual lamp.

15. The computer program product of claim 14, wherein:

lamps located on corners of the array of lamps are assigned a weight of 1;

lamps located on sides of the array of lamps are assigned a weight less than 1; and lamps located on an interior portion of the array of lamps are assigned a weight less than lamps located on the sides of the array of lamps.

16. The computer program product of claim 14, further comprising computer usable program code to, when executed by the processor, define a number of different zones on the build material bed; and assign each lamp to a zone with a one-to-one correlation when a number of lamps in the array of lamps equals the number of zones.

17. The computer program product of claim 14, further comprising computer usable program code to, when executed by the processor, define a number of different zones on the build material bed; and assign a group of multiple lamps to a zone when the number of lamps in the array of lamps is greater than the number of zones.

\* \* \* \* \*